(12) United States Patent
Mori

(10) Patent No.: US 9,470,842 B2
(45) Date of Patent: Oct. 18, 2016

(54) LASER PROCESSING APPARATUS CAPABLE OF SWITCHING FIBER CORE

(71) Applicant: FANUC CORPORATION, Minamitsuru-gun, Yamanashi (JP)

(72) Inventor: Atsushi Mori, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/833,506

(22) Filed: Aug. 24, 2015

(65) Prior Publication Data

US 2016/0062036 A1 Mar. 3, 2016

(30) Foreign Application Priority Data

Aug. 26, 2014 (JP) .................. 2014-171880

(51) Int. Cl.
| | |
|---|---|
| G02B 6/26 | (2006.01) |
| G02B 6/42 | (2006.01) |
| G02B 6/02 | (2006.01) |
| H01S 3/00 | (2006.01) |
| G02B 6/04 | (2006.01) |

(52) U.S. Cl.
CPC ......... *G02B 6/02042* (2013.01); *G02B 6/4296* (2013.01); *H01S 3/0064* (2013.01); *G02B 6/04* (2013.01)

(58) Field of Classification Search
CPC ............ G02B 6/02042; G02B 6/3254; G02B 6/4209; G21K 5/02; H01S 3/0064
USPC .......................................... 385/16; 250/492.1
See application file for complete search history.

(56) References Cited

U.S. PATENT DOCUMENTS

| | | | |
|---|---|---|---|
| 5,566,196 A | 10/1996 | Scifres | |
| 6,151,102 A * | 11/2000 | Nishi | ................... G03F 7/70358 250/584 |
| 2007/0237475 A1* | 10/2007 | Morita | ................. G02B 6/4296 385/115 |
| 2009/0092358 A1* | 4/2009 | Watanabe | .............. G02B 6/262 385/33 |

FOREIGN PATENT DOCUMENTS

| | | |
|---|---|---|
| JP | 5649507 | 5/1981 |
| JP | 6289617 | 6/1987 |
| JP | 282212 | 3/1990 |
| JP | 02-232618 A | 9/1990 |
| JP | 11151589 | 6/1999 |
| JP | 3978066 B | 9/2007 |

(Continued)

OTHER PUBLICATIONS

Partial Translation of Japanese Office Action dated Nov. 16, 2015 for Japanese Application No. 2014-171880.

*Primary Examiner* — Jerry Blevins
(74) *Attorney, Agent, or Firm* — RatnerPrestia

(57) ABSTRACT

A laser processing apparatus of the present invention comprises a laser light source which generates laser light, a transmission part which transmits laser light generated by the laser light source, and a processing head which condenses laser light transmitted by the second transmission part to irradiate a workpiece. The transmission part has a plurality of fiber cores and uses any one of the fiber cores to transmit laser light to the processing head. Each fiber core has an emission end which faces the processing head and is fixedly arranged with respect to the processing head. The laser processing apparatus further comprises a switching part which switches the fiber core which actually transmits laser light to the processing head among the plurality of fiber cores.

7 Claims, 10 Drawing Sheets

(56) References Cited

FOREIGN PATENT DOCUMENTS

| JP | 200941974 | 2/2009 |
| JP | 2012-24782 | 2/2012 |
| JP | 2012204547 | 10/2012 |
| JP | 2014-29537 A | 2/2014 |

* cited by examiner

LASER PROCESSING APPARATUS CAPABLE OF SWITCHING FIBER CORE

BACKGROUND OF THE INVENTION

1. Field of the Invention

The present invention relates to a laser processing apparatus which is capable of switching a fiber core for transmitting laser light to a processing head.

2. Description of the Related Art

A laser processing apparatus with an optical fiber for transmitting laser light generated by a laser light source and a processing head for condensing laser light emitted from the optical fiber to irradiate a workpiece has been known in the past. Such a laser processing apparatus is disclosed for example in JP-B-3978066, JP-A-H02-232618, JP-A-2014-029537, etc. In a general laser processing apparatus, the core diameter of the optical fiber and the image forming magnification of the condensing optical system determine a condensing diameter and condensing angle on the workpiece, the processing performance varies accordingly. The optimum condensing diameter on a workpiece is determined by the type of the laser processing (for example, welding, cutting, marking, etc.), material and thickness of the workpiece, etc.

FIG. 12 is a schematic view for explaining a relationship between a core diameter $D_0$ of a fiber core FC and flare angle $A_f$ at an emission end, and a condensing diameter $D_c$ and condensing angle $A_c$ at a condensing point. In general, the image forming magnification of a condensing optical system S is determined in accordance with a distance $d_1$ between an emission end of a fiber core FC and a condensing lens L, a distance $d_2$ between the condensing lens L and condensing point, and a focal distance $d_3$ of the condensing lens L. The condensing angle $A_c$ of the condensing optical system S is determined in accordance with the image forming magnification. It is possible to change the condensing diameter $D_c$ by changing the image forming magnification, but the condensing angle $A_c$ will also be changed together with the image forming magnification. This is because the product of the core diameter $D_0$ of the fiber core FC and the flare angle $A_f$ at the emission end is equal to the product of the condensing diameter $D_c$ and condensing angle $A_c$ at the condensing point. On the other hand, when the flare angle $A_f$ is unchanged, it is possible to change the condensing diameter $D_c$ without changing the condensing angle $A_c$, by suitably changing the core diameter $D_0$. Alternatively, it also is possible to change the condensing angle $A_c$ without changing the condensing diameter $D_c$, by suitably changing the core diameter $D_0$. In this way, it is possible to obtain the optimum condensing diameter $D_c$ and condensing angle $A_c$, by suitably selecting the core diameter $D_0$ of the fiber core FC for transmitting laser light to the condensing optical system S. However, in order to change the core diameter $D_0$ of a fiber core FC, it is necessary to replace the optical fiber which is connected to the processing head, and therefore, the optical components inside the processing head are liable to be contaminated and the processing precision is liable to fall due to the replacement of the optical fiber core FC. This is because most laser processing apparatuses are contained in housings for protecting the user from leakage of laser light, and the housing is filled with dust resulting from the laser processing.

In relation to this, JP-A-2012-024782 proposes a laser processing apparatus which selectively uses one of a plurality of process fibers with different core diameters to transmit laser light to a processing head. More specifically, in the laser processing apparatus of JP-A-2012-024782, a plate member to which a plurality of process fibers are attached is rotated by a motor so as to position one of the process fibers on the path of the light emitted from a feeding fiber. According to the laser processing apparatus of JP-A-2012-024782, it is no longer necessary to replace the process fiber each time changing the condensing diameter or condensing angle. However, the laser processing apparatus of JP-A-2012-024782 has a rotary member which is rotated by a motor and located in the vicinity of the incident part of laser light of the processing head, and therefore the optical components are still liable to be contained since dust around the processing head may enter from the incident part to the inside of the processing head. Further, the emission end of an optical fiber generates a certain amount of heat, and therefore it is preferable to install various cooling structures around the emission end. However, the process fibers of JP-A-2012-024782 are driven by a motor, and therefore it is difficult to provide these process fibers with a suitable cooling structure.

A laser processing apparatus which enables adjustment of the condensing diameter and condensing angle etc. of laser light without replacing the optical fiber which is connected to the processing head, and which can reliably prevent contamination of the optical components in the processing head is therefore being sought.

SUMMARY OF INVENTION

According to a first aspect of the present invention, there is provided a laser processing apparatus comprising: a laser light source which generates laser light, a light transmission part which transmits laser light generated by the laser light source, and a processing head which condenses laser light transmitted by the light transmission part to irradiate a workpiece, wherein the light transmission part has a plurality of fiber cores and uses any one of the plurality of fiber cores to transmit laser light to the processing head, each of the plurality of fiber cores has an emission end which faces the processing head and is fixedly arranged with respect to the processing head, and further comprises a switching part which switches the fiber core which transmits laser light to the processing head among the plurality of fiber cores.

According to a second aspect of the present invention, there is provided a laser processing apparatus in the first aspect, wherein emission ends of the plurality of fiber cores are fused to a single optical member which has the same refractive index as the plurality of fiber cores, and said optical member includes a nonreflective coating which is applied to an emission face of the optical member for emitting laser light which has passed through the optical member.

According to a third aspect of the present invention, there is provided a laser processing apparatus in the first or second aspect, wherein the plurality of fiber cores are contained in a plurality of optical fibers respectively and the emission ends of the plurality of optical fibers are joined together.

According to a fourth aspect of the present invention, there is provided the first or second aspect wherein the plurality of fiber cores are held in a single optical fiber.

According to a fifth aspect of the present invention, there is provided a laser processing apparatus in any one of the first to fourth aspects, wherein the switching part has an optical board which is located on a path of laser light generated by the laser light source aid is inclined with respect to a plane which is vertical to the path, and the switching part is configured to rate the optical board about an axis along the path so as to switch the fiber core which transmits laser light to the processing head.

According to a sixth aspect of the present invention, there is provided a laser processing apparatus in any one of the first to fourth aspects, wherein the switching part has an optical board which is located on a path of laser light generated by the laser light source, and the switching part is configured to rotate the optical board about an axis which is vertical to the path so as to switch the fiber core which transmits laser light to the processing head.

According to seventh aspect of the present invention, there is provided a laser processing apparatus in any one of the first to sixth aspects, wherein the plurality of fiber cores include two or more fiber cores which differ in at least one of diameter, cross-sectional shape, and refractive index.

These and other objects, features, and advantages of the present invention will become clearer with reference to the detailed description of an illustrative embodiment of the present invention which is shown in the attached drawings.

DETAILED DESCRIPTION OF EMBODIMENTS

Figure 1:
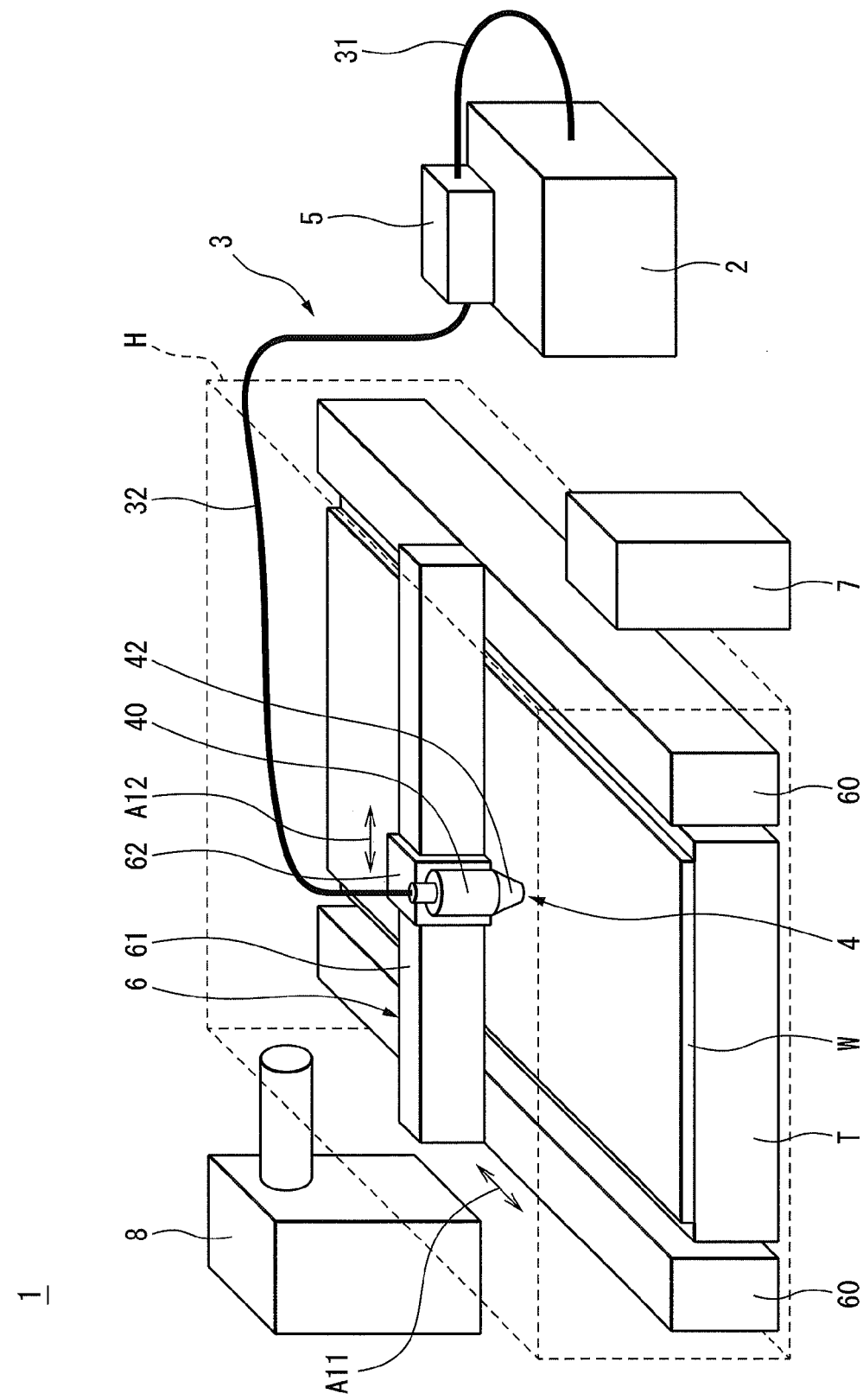
FIG. 1 is a perspective view which shows the overall structure of a laser processing apparatus of a first embodiment of the present invention.

Below, an embodiment of the present invention will be explained in detail with reference to the drawings. In the drawings, similar component elements are assigned similar reference notations. Note that the following explanation does not limit the technical scope of the inventions which are described in the claims or the meaning of terms etc.

Referring to FIG. 1 to FIG. 7, a laser processing apparatus of a first embodiment of the present invention will be explained. The laser processing apparatus of the present embodiment is configured to perform various laser processing operations (cutting, welding, marking, etc.) on a workpiece, using a condensing optical system of a processing head to condense a light beam which is transmitted by an optical fiber and to irradiate the workpiece. FIG. 1 is a perspective view which shows the overall structure of a representative laser processing apparatus 1 of the present embodiment. As shown in FIG. 1, the laser processing apparatus 1 is comprised of a laser light source 2 which generates laser light, a cable-shaped light transmission part 3 which transmits the laser light generated by the laser light source, a processing head 4 which condenses the laser light transmitted by the light transmission part 3 and irradiates a workpiece W, and a switching part 5 which is arranged in the middle of a transmission path of the laser light which is formed by the light transmission part. These component elements will be explained below in order.

First, the laser light source 2 of the present embodiment may be one of various laser oscillators which comprise laser media, laser resonators, excitation sources, etc. Next, the light transmission part 3 of the present embodiment comprises a first transmission part 31 which extends from the laser light source 2 to the switching part 5, and a second transmission part 32 which extends from the switching part 5 to the processing head 4. Further, the first transmission part 31 of the present embodiment is formed of one single-core optical fiber, while the second transmission part 32 of the present embodiment is formed of a bundle of single-core optical fibers. In particular, the second transmission part 32 is formed of a bundle of single-core optical fibers which differ in any of the diameters, cross-sectional shapes, and refractive indices of the fiber cores. These optical fibers extend over substantially the entire length of the direction of extension of the second transmission part 32, and each fiber can independently transmits the laser light which enters the base end facing the switching part 5, up to the front end part facing the processing head 4. Below, the end faces of the second transmission part 32, optical fibers and fiber cores which face the switching part 5 will sometimes be referred to as the "incident ends", while their end faces which face the processing head 4 will sometimes be referred to as the "emission ends".

Next, the processing head 4 of the present embodiment has a tubular-shaped body part 40 and a condensing optical system 41 which is arranged inside of the body part 40. As shown in FIG. 1, the body part 40 of the processing head 4 has a base end part to which a front end part of an optical fiber of the second transmission part 32 is connected, and a front end part to which a processing nozzle 42 is attached. The processing nozzle 42 is made of copper and various other materials. Further, the condensing optical system 41 of the processing head 4 has a lens unit comprising two aspherical lenses or a lens unit comprising four or so spherical lenses so as to reduce the spherical aberration (see FIG. 2 to FIG. 4). The processing nozzle 42 is arranged near the condensing point of the condensing optical system 41. The inside space of the body part 40 between the processing nozzle 42 and the final stage optical component of the condensing optical system 41 is an air-tight space, and an assist gas of a predetermined pressure is introduced in the inside space. The assist gas introduced into the inside space is ejected from the front end of the processing nozzle 42. The hole size of the processing nozzle 42 is usually 0.8 mm to 6.0 mm or so. The ejected flow of assist gas is preferably coaxial with the path of the emitted laser light, and therefore the processing nozzle 42 is provided with an axial center adjustment mechanism (not shown) which operates in a range of 2 mm to 5 mm or so. Alternatively, an alignment mechanism which is configured to align the path of the emitted laser light with the center of the processing nozzle 42 may be employed.

As shown in FIG. 1, the processing head 4 of the present embodiment is attached to a movement mechanism 6 which moves the processing head 4 planarly above a table T on which the workpiece W is placed. More specifically, the movement mechanism 6 of the present embodiment has a pair of rails 60 which extend in parallel straddling the table T, a bar-shaped first carriage 61 which is vertically mounted on the pair of rails 60, and a second carriage 62 of a predetermined shape which is attached movably to the first carriage 61. Further, the processing head 4 of the present embodiment is attached to the second carriage 62 so that the front end of the processing nozzle 42 faces the top surface of the table T. Each of the first carriage 61 and the second carriage 62 is configured to slide along the directions of the arrow mark A11 and arrow mark A12 in the figure. This ensures that the processing head 4 can move above the table T along the directions of the arrow mark A11 and arrow mark A12 while emitting laser light toward the workpiece W. The first carriage 61 and the second carriage 62 are driven by not shown servo motors or other drive devices.

As shown in FIG. 1, the table T, processing head 4, and movement mechanism 6 are contained in a box-shaped housing H. Such a structure may cause the inside space of the housing H to be filled with dust which is generated during the laser processing. Note that, there is a through hole at any location of the housing H for lead-in of the second transmission part 32, and part of the second transmission part 32 which includes the emission end is contained in the housing H together with the processing head 4. Such a housing H has the function of preventing the laser light emitted from the processing head 4 from leaking to the outside of the apparatus and thus causing harm to the user, and of preventing dust generated during laser processing from being released to outside the apparatus. In FIG. 1, for clarity of the inside structure of the housing H, the contours of the housing H are shown by broken lines and the inside structure of the housing H is shown by solid lines.

Next, the switching part 5 of the present embodiment has the function of switching the fiber core which actually transmits the laser light among the plurality of fiber cores of the second transmission part 32 in accordance with the selection of the user. That is, the switching part 5 of the present embodiment causes the laser light emitted from the first transmission part 31 selectively enters one of the fiber cores of the second transmission part 32. This enables change in the diameter of the fiber core for transmitting laser light to the processing head 4, and therefore it is possible to change the condensing diameter or condensing angle of the processing head 4 without replacing the optical fiber itself which is connected to the processing head 4. The detailed operation of the switching part 5 will be explained later with reference to FIG. 2.

Next, with reference to FIG. 1, the laser processing apparatus 1 of the present embodiment is provided with a control device 7 and a dust collector 8 which are both arranged at the outside of the housing H. The control device 7 of the present embodiment has the function of controlling the first carriage 61 and second carriage 62 and other movable parts. Further, the dust collector 8 of the present embodiment has the function of trapping dust inside of the housing H during the laser processing and discharging it to the outside of the housing H.

Figure 2:
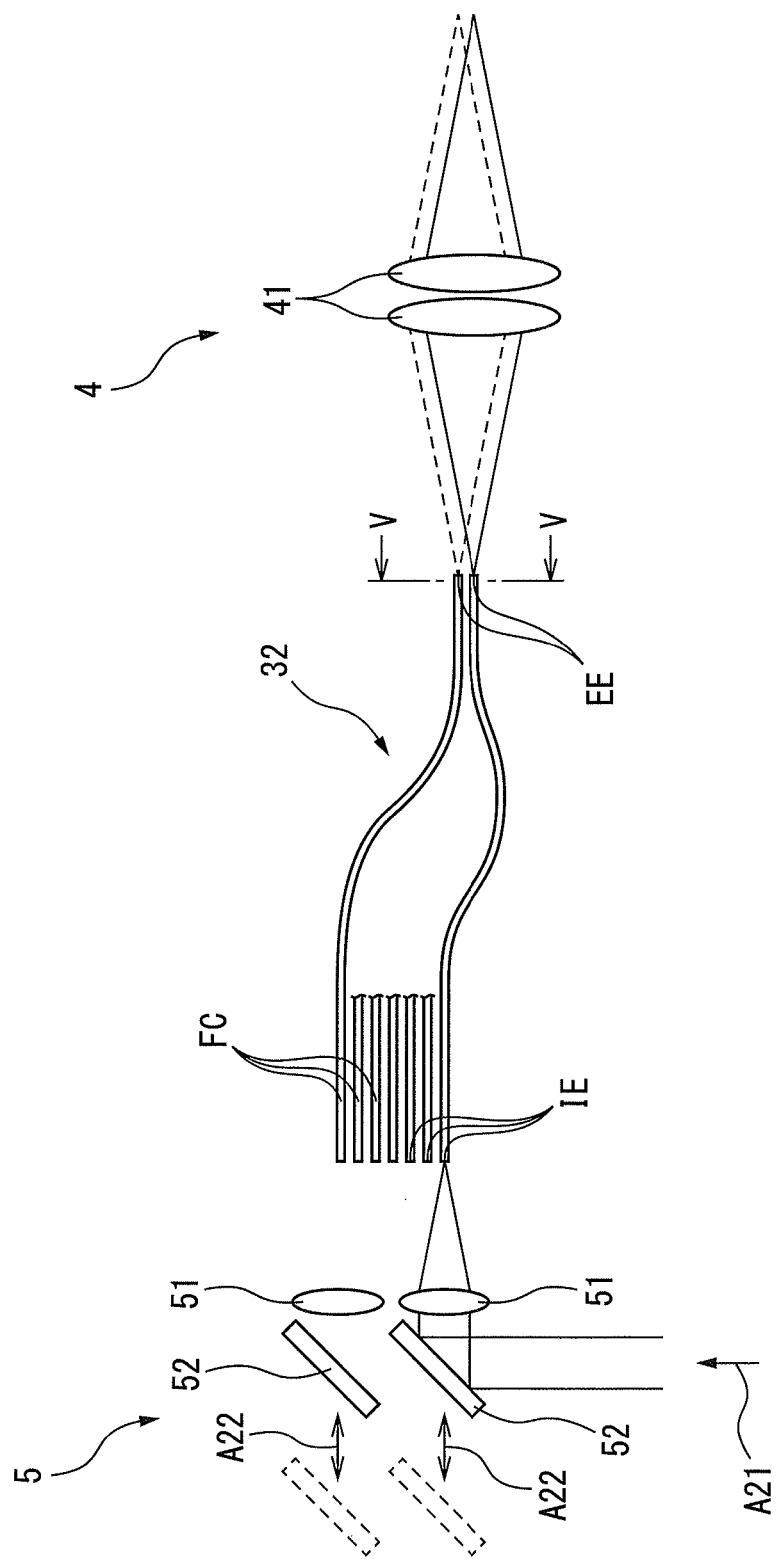
FIG. 2 is a schematic view for explaining an operation of a switching part in FIG. 1.

FIG. 2 is a schematic view for explaining the operation of the switching part 5 of the present embodiment. The switching part 5 of the present embodiment is a beam switch which causes the laser light emitted from the optical fiber of the first transmission part 31 selectively enters one of the fiber cores FC of the second transmission part 32. As shown in FIG. 2, the second transmission part 32 of the present embodiment has seven fiber cores FC. As shown in FIG. 2, the switching part 5 of the present embodiment includes a plurality of condensing optical systems 51 which condense laser light emitted from the first transmission part 31 at the incident ends IE of the plurality of fiber cores FC, and shutter mirrors 52 corresponding to these condensing optical systems 51. Note that, FIG. 2 shows only two pairs of condensing optical systems 51 and shutter mirrors 52, and the remaining five pairs of condensing optical systems 51 and shutter mirrors 52 are omitted. Further, in FIG. 2, for the two fiber cores FC, the total lengths from their incident ends IE to their emission ends EE are shown, but for the remaining five fiber cores FC, their incident ends IE and their vicinities are only shown, and the other parts are omitted. Further, in FIG. 2, the path of the laser light emitted from the optical fiber of the first transmission part 31 is shown by the arrow mark A21.

As shown in FIG. 2, the shutter mirrors 52 are configured to move back and forth between a reflection position which reflects laser light along a direction vertical to the path of the laser light emitted from the first transmission part 31, and a retracted position where laser light is not reflected. The movement direction of these shutter mirrors 52 is shown by the arrow marks A22 in the figure. The shutter mirrors 52 are driven by motors or other not shown drive devices. In FIG. 2, a shutter mirror 52 in the reflection position is shown by the solid lines, while a shutter mirror 52 in a retracted position is shown by the broken lines. As shown in FIG. 2, the shutter mirror 52 in the reflection position is oriented to reflect laser light emitted from the first transmission part 31 toward the corresponding condensing optical system 51. Further, the switching part 5 of the present embodiment is configured to place just one shutter mirror 52 corresponding to the single fiber core FC which is selected by the user at the reflection position, and to place the remaining shutter mirrors 52 at the retracted positions. This ensures that the laser light emitted from the first transmission part 31 enters only one fiber core FC which is selected by the user. However, the switching part 5 of the laser processing apparatus 1 of the present embodiment may be configured to use a single condensing optical system and a mechanism cooperating with the system, instead of a plurality of condensing optical systems 51 and a plurality of shutter mirrors 52, so as to switch the fiber core FC which transmits the laser light. First and second modifications of the thus configured switching part 5 are shown in FIG. 3 and FIG. 4.

Figure 3:
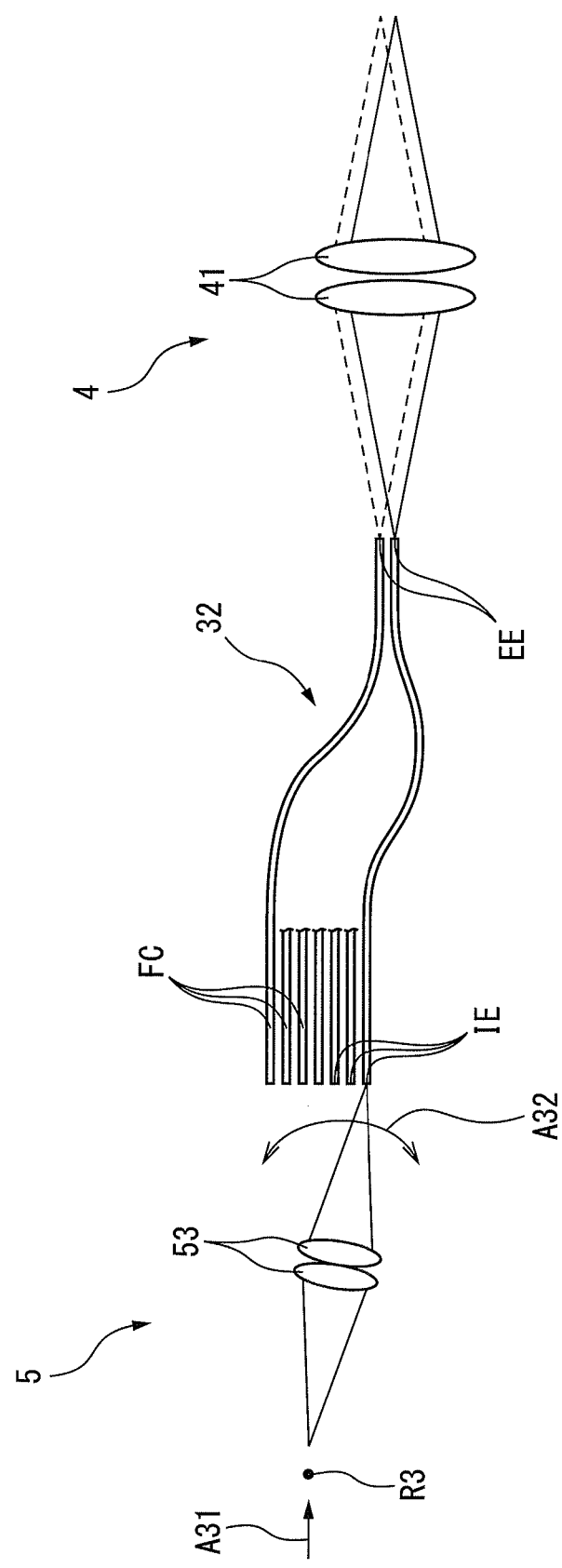
FIG. 3 is a schematic view, similar to FIG. 2, which shows a first modification of the switching part in the laser processing apparatus of the present embodiment.

FIG. 3 is a schematic view, similar to FIG. 2, which shows a first modification of the switching part in the laser processing apparatus 1 of the present embodiment. As shown in FIG. 3, the switching part 5 of the present embodiment is provided with a single condensing optical system 53 which condenses laser light emitted from the first transmission part 31. Further, the condensing optical system 53 of the present embodiment is configured to rock about an axis R3 which is vertical to the path of laser light emitted from the first transmission part 31. The path of the laser light emitted from the first transmission part 31 is shown by the arrow mark A31 in the figure. That is, the switching part 5 of the present embodiment generates rocking motion of the condensing optical system 53 by using a not shown motor or piezoelectric actuator etc. as the power source, and thus moves the position of the condensing point of the condensing optical system 53 along the top-bottom direction in the figure. This enables switching of the fiber core FC of the second transmission part 32 which transmits the laser light. The direction of rocking motion of the condensing optical system 53 of the present embodiment is shown by the arrow mark A32 in the figure. According to the switching part 5 of the present embodiment, it is no longer necessary to provide a plurality of condensing optical systems and a plurality of shutter mirrors corresponding to the incident ends IE of the plurality of fiber cores FC, and thus possible to place the incident ends IE of the plurality of fiber cores FC adjacent to one another and to reduce the dimensions of the switching part 5 as a whole.

Figure 4:
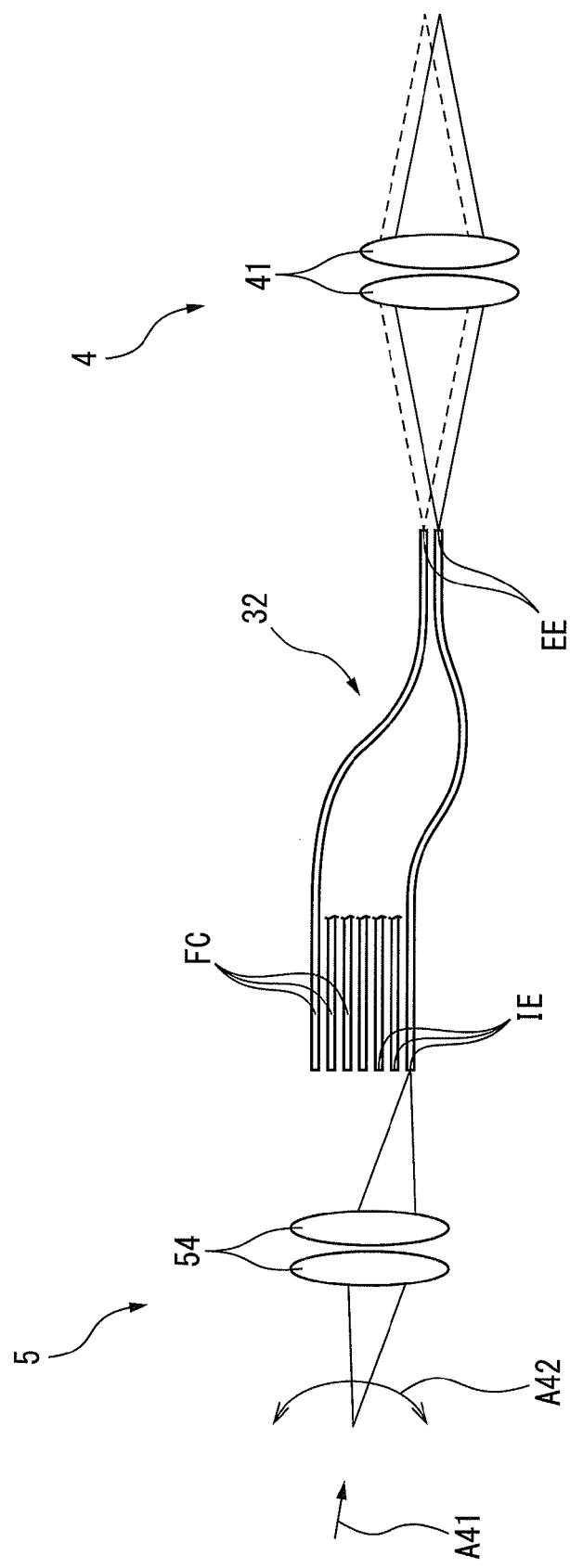
FIG. 4 is a schematic view, similar to FIG. 2, which shows a second modification of the switching part in the laser processing apparatus of the present embodiment.

FIG. 4 is a schematic view, similar to FIG. 2, which shows a second modification of the switching part 5 in the laser processing apparatus 1 of the present embodiment. In the same way as the example of FIG. 3, the switching part 5 of the present embodiment is provided with a single condensing optical system 54. The condensing optical system 54 of the present embodiment is configured to condense the laser light which has entered the system to cause the laser light to enter the incident end of the second transmission part 32. Further, the switching part 5 of the present embodiment is further provided with a not shown angle changing part which changes the inclined angle of the laser light emitted from the first transmission part 31 to enter the condensing optical system 54 with respect to the optical axis of the condensing optical system 54. More specifically, the angle changing part of the switching part 5 of the present embodiment changes the inclined angle of the laser light which enters the condensing optical system 54 by bending slightly the front end part of the first transmission part 31 which faces the condensing optical system 54 by means of a motor or piezoelectric device or other power source. This ensures that the condensing point of the condensing optical system 54 moves along the top-bottom direction in the figure, and thus enables switching of the fiber core FC of the second transmission part 32 which transmits the laser light. The path of the laser light emitted from the first transmission part 31 and enters the condensing optical system 54 is shown by the arrow mark A41 in the figure. Further, the direction in which the front end part of the first transmission part 31 is bent is shown by the arrow mark A42 in the figure. In the same way as the above first modification in FIG. 3, according to the switching part 5 of the present embodiment, it is possible to place the incident ends IE of a plurality of fiber cores FC adjacent to one another, and to reduce the dimensions of the switching part 5 as a whole.

Figure 5:
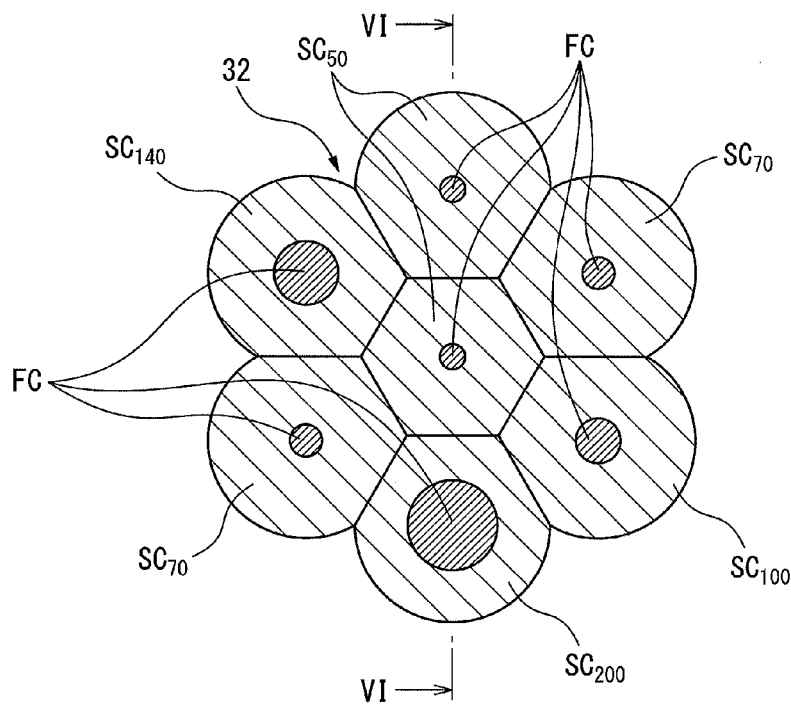
FIG. 5 is a horizontal cross-sectional view of an emission end and its vicinity of a second transmission part in FIG. 2.

Referring again to FIG. 2, in the second transmission part 32 of the present embodiment, the incident ends IE of the plurality of fiber cores FC are arranged in a single row, while the emission ends EE of the fiber cores FC are bundled to be adjacent to one another. FIG. 5 is a horizontal cross-sectional view of the emission end and its vicinity of the second transmission part 32 in the figure. More specifically, FIG. 5 shows a cross-section of the second transmission part 32 along the line V-V in FIG. 2. As shown in FIG. 5, the plurality of single-core optical fibers SC which form the second transmission part 32 are joined together in the vicinity of their emission ends. As a result, these fiber cores FC are arranged adjacent to one another. The plurality of single-core optical fibers SC can be joined by a known method. For example, the plastic protective coverings of the single-core optical fibers SC may be joined together by heat fusion bonding or the outer circumferential surfaces of these protective coverings may also be joined together by various binders.

In the example of FIG. 5, optical fiber $SC_{50}$ with a fiber core diameter of 50 μm, optical fiber $SC_{70}$ with a fiber core diameter of 70 μm, optical fiber $SC_{100}$ with a fiber core diameter of 100 μm, optical fiber $SC_{200}$ with a fiber core diameter of 200 μm, optical fiber $SC_{70}$ with a fiber core diameter of 70 μm, and optical fiber $SC_{140}$ with a fiber core diameter of 140 μm are arranged along the circumferential direction in that order so as to surround the outer circumferential surface of one optical fiber $SC_{50}$ with a fiber core diameter of 50 μm. As shown in FIG. 5, the optical fiber $SC_{50}$ which is arranged at the center is joined to the six optical fibers SC which are arranged in the circumferential direction. Further, each of the six optical fibers SC which are arranged in the circumferential direction is joined to the two adjoining optical fibers SC at the two sides in the circumferential direction. Incidentally, the smaller the fiber core diameter of an optical fiber, the easier the optical fiber is damaged, and therefore spare fibers are often required for the optical fiber $SC_{50}$ with the fiber core diameter of 50 μm and the optical fiber $SC_{70}$ with the fiber core diameter of 70 $μm_0$. This is the reason why there are two optical fiber $SC_{50}$ with diameters of 50 μm and two optical fibers $SC_{70}$ with diameters of 70 μm. Alternatively, it is possible to change the condensing angles of the two optical fibers $SC_{50}$ with diameters of 50 μm at their incident ends. In an optical fiber, the condensing angle at the incident end is reflected to a certain extent in the flare angle of the emission end, and therefore it possible to change the condensing angle even without changing the condensing diameters on the surface of the workpiece when these two fibers are selected. The outside diameters of the optical fibers SC are about 1 mm, and therefore the outside diameter of the bundle of the seven optical fibers SC in the vicinity of the emission end of the second transmission part 32 is about 3 mm. However, the distances from the fiber cores FC of the six optical fibers SC which are arranged in the circumferential direction to the center axis CA of the processing head 4 are generally less than 1 mm (see FIG. 6).

As shown in FIG. 5, the second transmission part 32 of the present embodiment has a plurality of fiber cores FC with different diameters. Therefore, the laser processing apparatus 1 of the present embodiment can adjust the condensing diameter and condensing angle etc. of the processing head 4 in accordance with the diameter of the fiber core FC selected by the user.

Incidentally, the second transmission part 32 of the laser processing apparatus 1 of the present embodiment may also have a plurality of fiber cores with different cross-sectional shapes, or have a plurality of fiber cores FC with different refractive indices. In general, the intensity of laser light emitted from an optical fiber changes depending on the refractive index of the fiber core, and therefore it is possible to adjust the intensity of the laser light emitted from the processing head 4 by adopting a plurality of fiber cores FC with different refractive indices. As a result, it is possible to adjust the processing performance of the laser processing apparatus 1.

Figure 12:
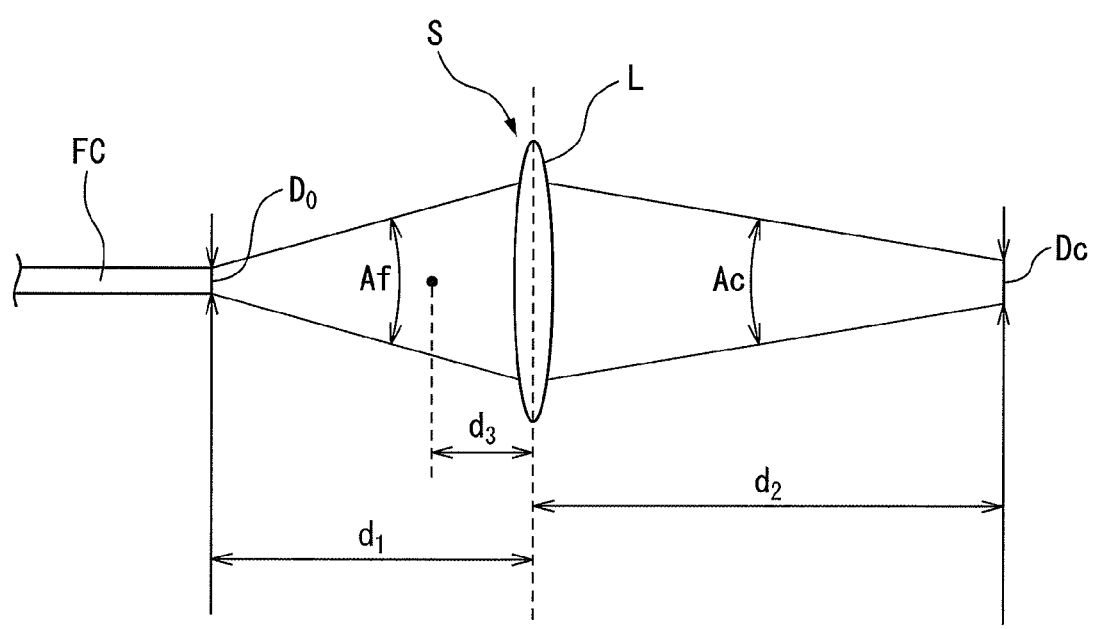
FIG. 12 is a schematic view for explaining the relationship between the core diameter of a fiber core and a condensing diameter and condensing angle.

Referring again to FIG. 2, the distance from the emission ends EE of the fiber cores FC to the condensing optical system 41 of the processing head 4 is 100 mm or so, and the distance from the condensing optical system 41 of the processing head 4 to the condensing point of the processing head 4 is 120 mm or so. The image forming magnification in this case is 1.2 (120/100), and therefore the condensing diameter of the processing head 4 is a size of 1.2 times the diameter of the fiber core FC which transmits the laser light to the processing head (see also FIG. 12). Note that, the flare angle of the laser light emitted from the fiber cores FC is, for example, 80 mrad in a half angle, while the condensing angle at the focal point is for example 96 mrad. If different fiber core diameters are selected, the condensing diameter is changed according to the fiber core diameter with the flare angle being unchanged. It is also possible to change the image forming magnification by changing the lens of the condensing optical system 41 which is located closer to the workpiece W. If the image forming magnification is suitably selected, it is possible to realize different condensing angles for laser processing without changing the condensing diameter. In the above example, if the image forming magnification is 1.0 and the fiber core diameter is 1.2 times larger, it is possible to obtain a condensing angle of 80 mrad without changing the condensing diameter.

Figure 6:
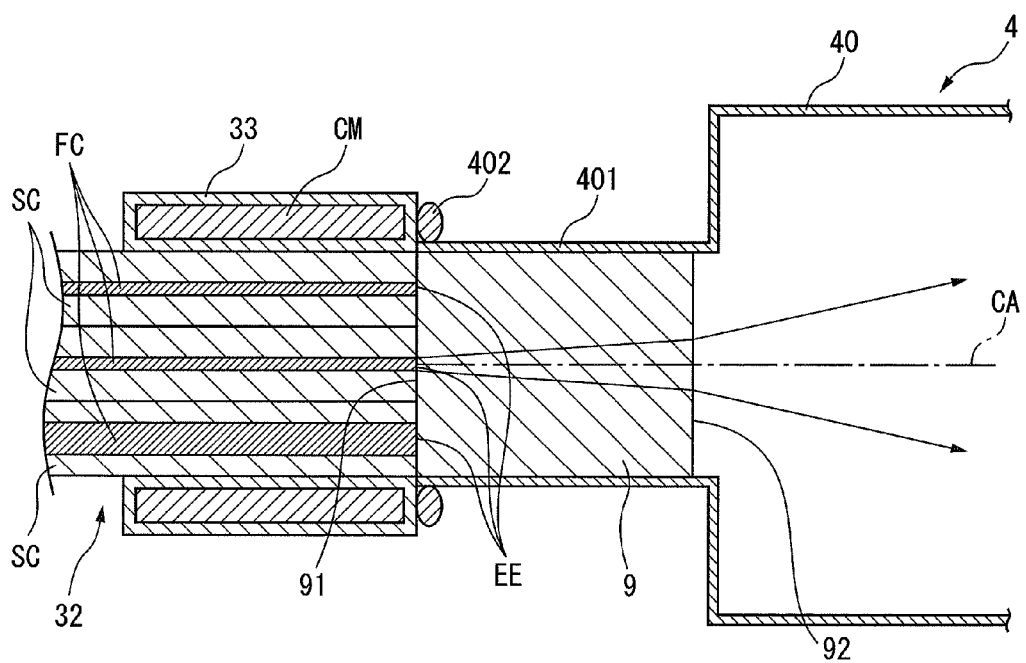
FIG. 6 is a vertical cross-sectional view of an emission end and its vicinity of a second transmission part in FIG. 2.

Next, FIG. 6 is a vertical cross-sectional view of the emission end and its vicinity of the second transmission part 32 in FIG. 2. More specifically, FIG. 6 shows the cross-section of the second transmission part 32 along the line VI-VI in FIG. 5. As shown in FIG. 6, the emission ends EE of the fiber cores FC of the second transmission part 32 are located adjacent to the center axis CA of the processing head 4 which passes through the center of the hole of the processing nozzle 42. Here, the path of the laser light at the emission end of each fiber core is usually parallel to the optical axis of the condensing optical system 41 of the processing head 4. For this reason, if fiber cores FC are switched, the condensing point of the condensing optical system 41 shifts slightly along the diametrical direction, but the processing head 4 of the present embodiment can align the axial center of the processing nozzle 42 with the path of the output laser light by means of the above axial center adjustment mechanism. When the image forming magnification is fixed, it is possible to cause the optical axis of the condensing optical system 41 of the processing head 4 to intersect with the path of the output laser light at the condensing point by slanting the paths of the laser light at the emission ends EE of some fiber cores. As a result, even if the fiber cores FC are switched, the condensing point will no longer be shifted in the diametrical direction.

As shown in FIG. 6, the emission end EE of each fiber core FC of the second transmission part 32 is joined to one end face 91 of a single optical member 9 which has a columnar shape. The optical member 9 of the present embodiment is made from a glassy substance with the same refractive index as the plurality of fiber cores FC. The emission ends EE of the plurality of fiber cores FC can be joined to the end face 91 of the optical member 9 by a known technique. For example, the plurality of fiber cores FC are made from a glassy substance, and therefore it is possible to join these emission ends EE to the end face 91 of the optical member 9 by heating and softening these emission ends EE in a high temperature. In general, fiber cores FC have extremely low attenuation rates, but the emission ends EE of the fiber cores FC generate some heat accompanying refraction of the laser light. However, the emission ends EE of the fiber cores FC of the present embodiment are joined to the optical member 9 which has the same refractive index as the fiber cores FC, and therefore the above heat generated along with refraction of the laser light occurs not at the emission ends EE of the fiber cores FC, but at the other end face 92 of the optical member 9. As shown in FIG. 6, the end face 92 of the optical member 9 has a far larger surface area than the emission ends EE of the fiber cores FC, and therefore it is possible to suppress the temperature rise due to the above heat generation. Further, the end face 92 of the optical member 9 is easier to be cooled since it has a larger surface area. Furthermore, the large surface area of the end face 92 of the optical member 9 has the advantage of easier application of a nonreflective coating. Such a nonreflective coating can be used to reduce the attenuation of laser light.

Figure 7:
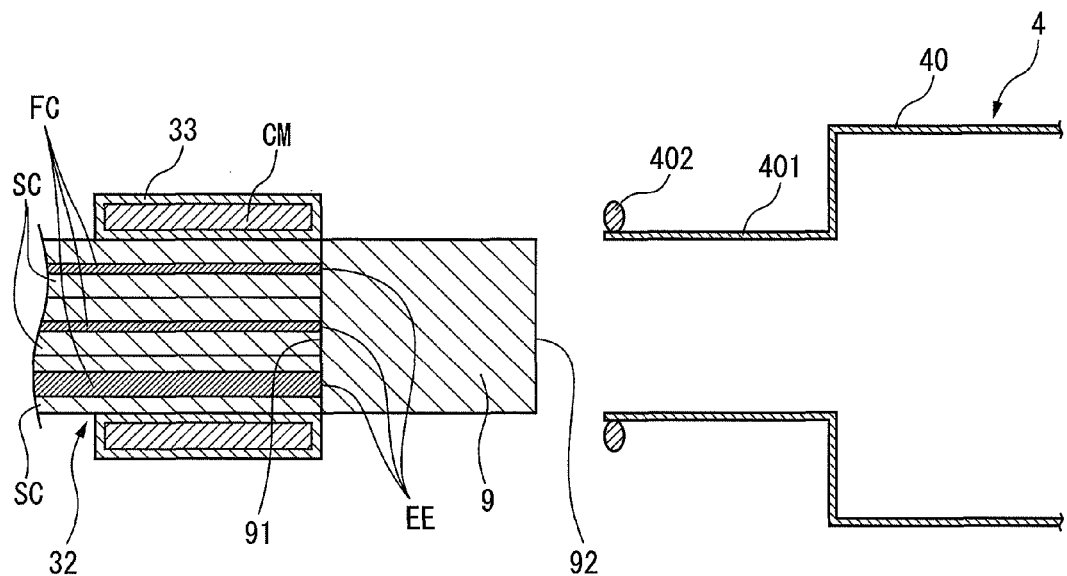
FIG. 7 is a vertical cross-sectional view, similar to FIG. 6, which shows a state where the second transmission part is detached from the processing head.

Next, with reference to FIG. 6, the base end part of the body part 40 of the processing head 4 is provided with a tubular fitting part 401 in which the above optical member 9 can be inserted. As shown in FIG. 6, the optical member 9 is inserted into the fitting part 401 so that the second transmission part 32 is attached to the processing head 4. Further, in the state where the second transmission part 32 is attached to the processing head 4, the emission ends EE of the plurality of fiber cores FC are fixedly arranged with respect to the processing head 4. Note that, FIG. 7 is a vertical cross-sectional view, similar to FIG. 6, which shows the state where the second transmission part 32 is detached from the processing head 4. As shown in FIG. 7, the optical member 9 can be pulled out from the fitting part 401 so that the second transmission part 32 is detached from the processing head 4. However, the second transmission part 32 in the present embodiment has a plurality of optical fibers SC with different diameters of fiber cores, and therefore it is not necessary to detach the second transmission part 32 from the processing head 4 for the purpose of changing the condensing angle and condensing diameter etc. of the processing head 4. If the optical member 9 is inserted into the fitting part 401 of the processing head 4, the outer circumferential surface of the optical member 9 closely contacts the inner circumferential surface of the fitting part 401 without clearance, and therefore it is possible to prevent dust produced during the laser processing from entering the inside of the processing head 4.

As shown in FIG. 6, the second transmission part 32 of the present embodiment has a tubular-shaped cooling part 33 which is attached to the outer circumferential surface in the vicinity of the emission end. The cooling part 33 of the present embodiment is configured to cool the vicinity of the emission ends EE of the plurality of fiber cores FC. More specifically, the cooling part 33 of the present embodiment has a ring-shaped cavity which extends along its circumferential direction. A cooling medium CM is circulated at the inside of this cavity so as to cool the vicinities of the emission ends EE of the plurality of fiber cores FC. In general, the fiber cores FC have extremely low attenuation rates, but when the laser light passes through the emission end EE of a fiber core FC and crosses a boundary surface of different refractive indexes, a certain extent of heat will be generated at that boundary surface. For such a reason, a cooling structure is required for cooling the emission ends EE and their vicinities of the fiber cores FC. In the laser processing apparatus 1 of the present embodiment, the emission ends EE of the plurality of fiber cores FC are located adjacent to one another, and therefore it becomes possible to adopt a cooling part 33 of a simple structure for cooling the emission ends EE of the plurality of fiber cores FC all together.

Further, the body part 40 of the processing head 4 is provided with a ring-shaped dustproofing seal 402 which is attached to the outer circumferential surface of the tubular fitting part 401. The dustproofing seal 402 of the present embodiment can abut against a predetermined ring-shaped surface of the second transmission part 32, for example, the bottom surface of the tubular cooling part 33. This allows for improved dustproof property of the processing head 4. The dustproofing seal 402 of the present embodiment also has the function of accurately positioning the emission end of the second transmission part 32 with respect to the processing head 4 when the second transmission part 32 is attached to the processing head 4. Therefore, it is possible to minimize deviation of the path of the laser light due to attachment or detachment of the second transmission part 32. In this way, the laser processing apparatus 1 of the present embodiment may have dustproof property and cooling function equal to or better than those of a conventional apparatus.

In the above way, the laser processing apparatus 1 of the present embodiment has a switching part 5 which can arbitrarily switch the fiber core FC which actually transmits laser light to the processing head 4, and therefore it is possible to adjust the condensing diameter and condensing angle etc. of the output laser light without exchanging the optical fiber which is connected to the processing head 4. Further, according to the laser processing apparatus 1 of the present embodiment, the optical member 9 fused to the emission ends EE of the plurality of fiber cores FC fits into the fitting part 401 of the processing head 4 so that the plurality of fiber cores FC are attached to the processing head 4. In this way, according to the laser processing apparatus 1 of the present embodiment, the emission ends EE of the plurality of fiber cores FC are fixedly arranged with respect to the processing head 4, and therefore it is no longer necessary to install a moveable member in the vicinity of the incident part of laser light of the processing head 4 (that is, in the vicinity of the fitting part 401 of the body part 40). Therefore, according to the laser processing apparatus 1 of the present embodiment, it is possible to prevent dust around the processing head 4 from entering from the incident part into the processing head 4 to contaminate the optical components, and thus possible to improve the dustproof property of the processing head 4.

Further, according to the laser processing apparatus 1 of the present embodiment 1, the emission ends and their vicinities of the plurality of single-core optical fibers SC are joined with one another, and therefore it is possible to arrange the adjoining emission ends EE of the fiber cores FC closer to each other by for example a distance of 1 mm or so. This ensures that the paths of the laser light emitted from the plurality of fiber cores FC are also arranged closer to one another, and therefore it is possible to reduce the amount of movement of the condensing point of the processing head 4 due to switching of fiber cores FC. As a result, it is no longer necessary to adjust the axial center of the processing head 4, or it is only necessary to adjust the axial center in a small range. Furthermore, the emission ends EE of these fiber cores FC are located adjacent to the center axis CA of the processing head 4, and therefore it is possible to suppress the influence of geometric aberration no matter which fiber core FC is selected. Accordingly, the laser processing apparatus 1 of the present embodiment can have a processing performance which compares favorably with a laser processing apparatus with only one single-core optical fiber being connected to the processing head.

Next, referring to FIG. 8 to FIG. 11, a laser processing apparatus of a second embodiment of the present invention will be explained. The laser processing apparatus of the present embodiment has an overall structure which is similar to the laser processing apparatus of the above-mentioned first embodiment (see FIG. 1). For this reason, reference notations similar to the above-mentioned first embodiment will be used for the elements of the laser processing apparatus of the present embodiment. Further, the laser processing apparatus of the present embodiment has similar functions and structures as the laser processing apparatus of the first embodiment except for the elements which are specifically explained below. Detailed explanations of the elements similar to the first embodiment will be omitted.

Figure 8:
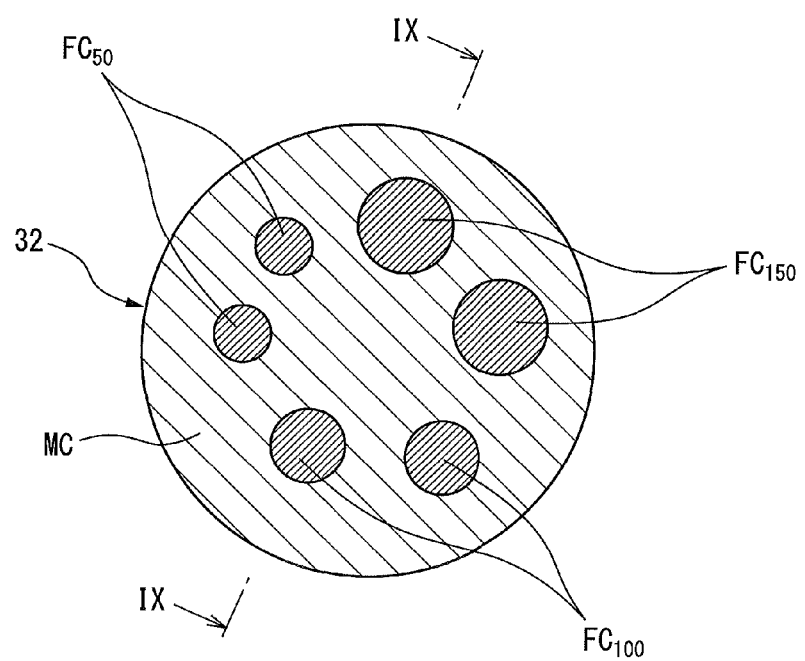
FIG. 8 is a horizontal cross-sectional view of a second transmission part in a laser processing apparatus of a second embodiment of the present invention.

FIG. 8 is a horizontal cross-sectional view of a representative second transmission part 32 in the laser processing apparatus 1 of the present embodiment. As shown in FIG. 8, the second transmission part 32 of the present embodiment comprises a single multicore optical fiber MC which contains a plurality of fiber cores FC. Each of these fiber cores FC can independently transmit laser light which enters the incident end IE to the emission end EE (see FIG. 10 as well).

More specifically, the multicore optical fiber MC of the present embodiment contains six fiber cores which are arranged at intervals along the circumferential direction about its center axis, that is, two fiber cores $FC_{50}$ with diameters of 50 μm, two fiber cores $FC_{150}$ with diameters of 150 μm, and two fiber cores $FC_{100}$ with diameters of 100 μm. The number and arrangement of the fiber cores FC which are contained in the multicore optical fiber MC and the dimensions and shapes etc. of the fiber cores F are not limited to only the examples in the figures. Further, the multicore optical fiber MC of the second transmission part 32 may also contain a plurality of fiber cores FC which differ in refractive indices or other properties, instead of a plurality of fiber cores FC with different diameters.

As shown in FIG. 8, according to the second transmission part 32 of the present embodiment, the distance between adjoining emission ends EE of fiber cores FC is shortened, and therefore it is possible to locate the paths of the laser light emitted from these fiber cores FC closer to one another. As a result, it is possible to reduce the amount of movement of the condensing point due to switching of the fiber cores FC. The distance between adjoining emission ends EE in the bundled single-core optical fibers SC is bundled is for example 1 mm (see FIG. 5), while the distance between adjoining emission ends EE of the second transmission part 32 of the present embodiment is for example 500 μm. Further, according to the second transmission part 32 of the present embodiment, it is possible to shorten not only the distance between adjoining emission ends EE, but also the distance between adjoining incident ends IE, and therefore the switching part 5 can perform switching of the fiber cores FC in a shorter time.

Figure 9:
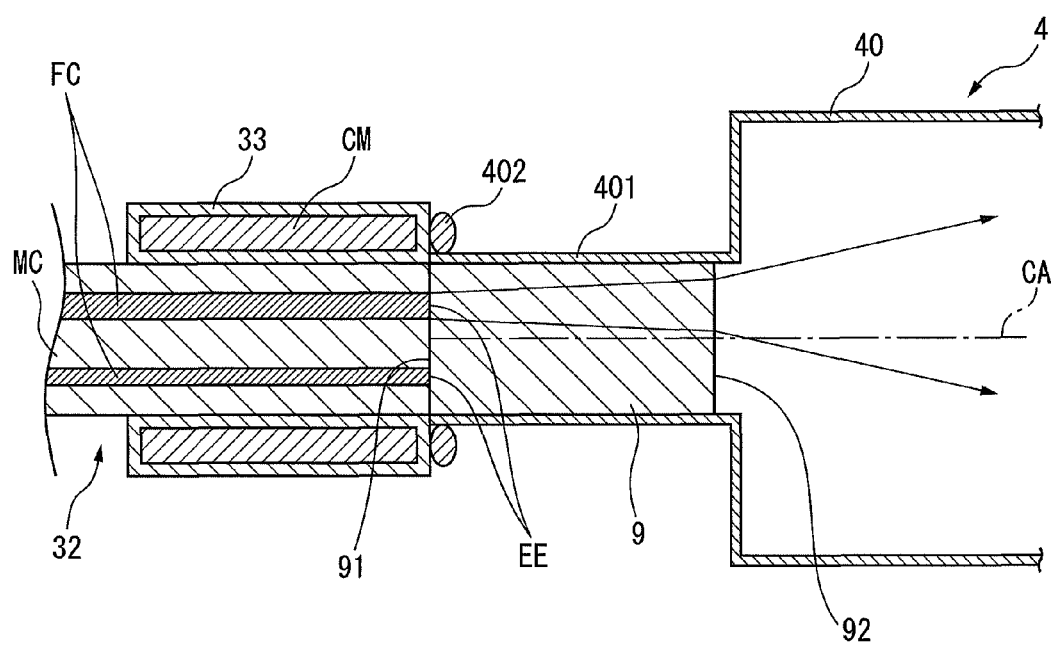
FIG. 9 is a vertical cross-sectional view of an emission end and its vicinity of the second transmission part of FIG. 8.

FIG. 9 is a vertical cross-sectional view of the vicinity of the emission end of the second transmission part 32 of FIG. 8. More specifically, FIG. 9 shows the cross-section of the second transmission part 32 along the line IX-IX in FIG. 8. As shown in FIG. 9, according to the second transmission part 32 of the present embodiment, it is no longer necessary to join together the vicinities of the emission ends of the plurality of optical fibers, and therefore it is possible to simplify the process of assembly of the second transmission part 32. Further, according to the second transmission part 32 of the present embodiment, it is no longer necessary to align the emission ends of the plurality of optical fiber when joining the emission ends EE of the plurality of fiber cores FC to the optical member 9, and therefore it is possible to simplify the process of assembly of the second transmission part 32. Further, according to the second transmission part 32 of the present embodiment, the emission ends EE of the fiber cores FC are located closer to the center axis CA of the processing head 4, and therefore it is possible to suppress the influence of geometric aberration.

Figure 10:
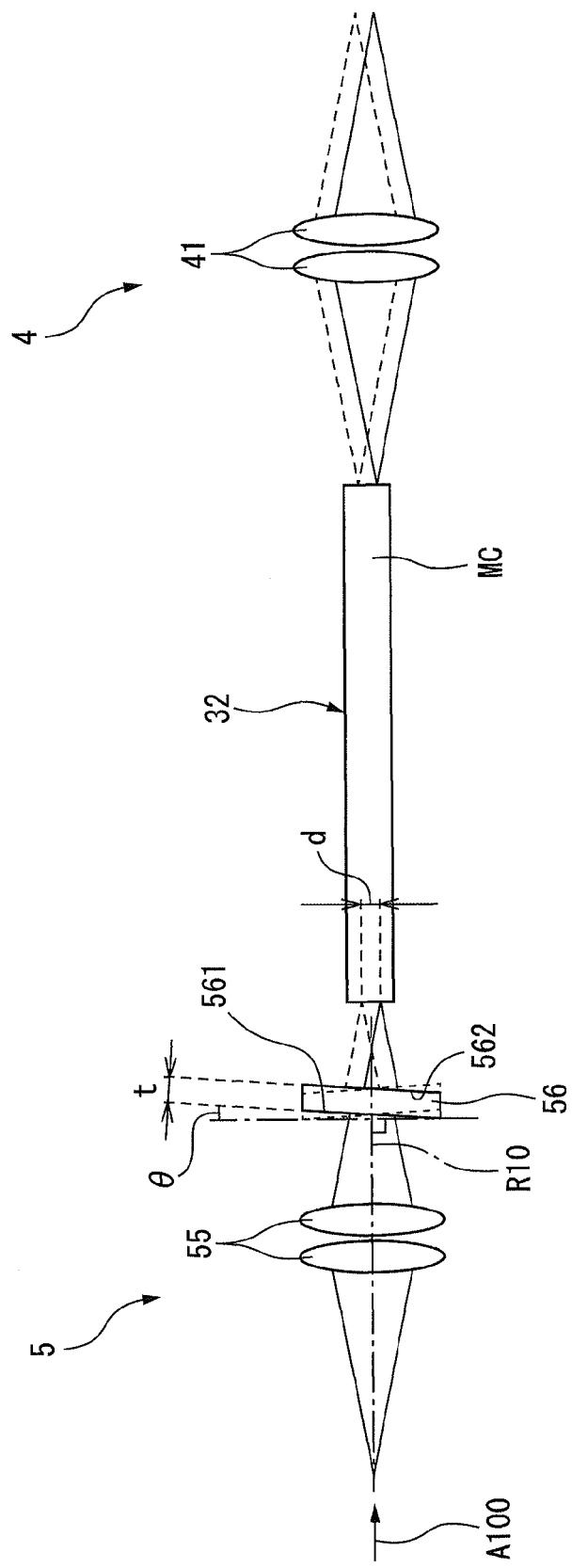
FIG. 10 is a schematic view for explaining the operation of the switching part in the laser processing apparatus of the present embodiment.

FIG. 10 is a schematic view for explaining the operation of the representative switching part 5 in the laser processing apparatus 1 of the present embodiment. As shown in FIG.

10, the switching part 5 of the present embodiment comprising a single condensing optical system 55 which condenses the laser light emitted from the first transmission part 31, and a light-transmitting optical board 56 which is located between the condensing optical system 55 and the second transmission part 32. The path of the laser light emitted from the first transmission part 31 and enters the condensing optical system 55 is shown by the arrow mark A100 in the figure. As shown in FIG. 10, the path of the laser light which enters the condensing optical system 55 is aligned with the optical axis of the condensing optical system 55. The laser light which passes through the condensing optical system 55 enters the first main surface 561 of the optical board 56, and then emits from the second main surface 562 of the optical board 56. The first and second main surfaces 561, 562 of the optical board 56 are preferably parallel to each other. As shown in FIG. 10, the optical board 56 of the present embodiment is slanted by exactly an angle with respect to a virtual plane which is vertical to the optical axis of the condensing optical system 55. This ensures that the laser light which passes through the condensing optical system 55 is refracted after entering the optical board 56 at a slant, and therefore the path of the laser light emitted from the optical board 56 is translated by a predetermined distance with respect to the path of the laser light which enters the optical board 56. In this way, the translation distance "d" of the laser light is calculated by the following formula 1. In formula 1, "t" is the thickness of the optical board 56, while "n" is the refractive index of the optical board 56. For example, when the thickness "t" of the optical board 56 is 5 mm, the refractive index "n" of the optical board 56 is 1.5, and the inclined angle θ of the optical board 56 is 7°, the translation distance "d" of the laser light is 205 μm.

$$d = t \times \sin\theta \times (1 - \cos\theta/\sqrt{n^2 - \sin^2\theta})$$ (Formula 1)

Further, the optical board 56 of the present embodiment is configured to rotate about the rotation axis R10 along the optical axis of the condensing optical system 55. Therefore, along with rotational motion of the optical board 56, the condensing point of the laser light emitted from the optical board 56 is moved along a circumferential path which has a radius equal to the above translation distance "d". Therefore, if the plurality of fiber cores FC of the second transmission part 32 are arranged on a circumference with a radius equal to the above translation distance "d", it is possible to switch the fiber core FC entered by the laser light, just by rotating the optical board 56 about the rotation axis R10. Further, the plurality of fiber cores FC are preferably arranged at equal intervals on the above circumference. For example, if the multicore optical fiber MC contains six fiber cores FC (see FIG. 8), these fiber cores FC are preferably arranged in the circumferential direction at intervals equal to arcs of fans with center angles of 60°. This makes it easier to position the condensing point of the condensing optical system 55 with respect to the incident ends IE of the fiber cores FC. Note that the optical board 56 of the present embodiment may be rotated by the user by hand, or rotated by a motor or other drive device.

Figure 11:
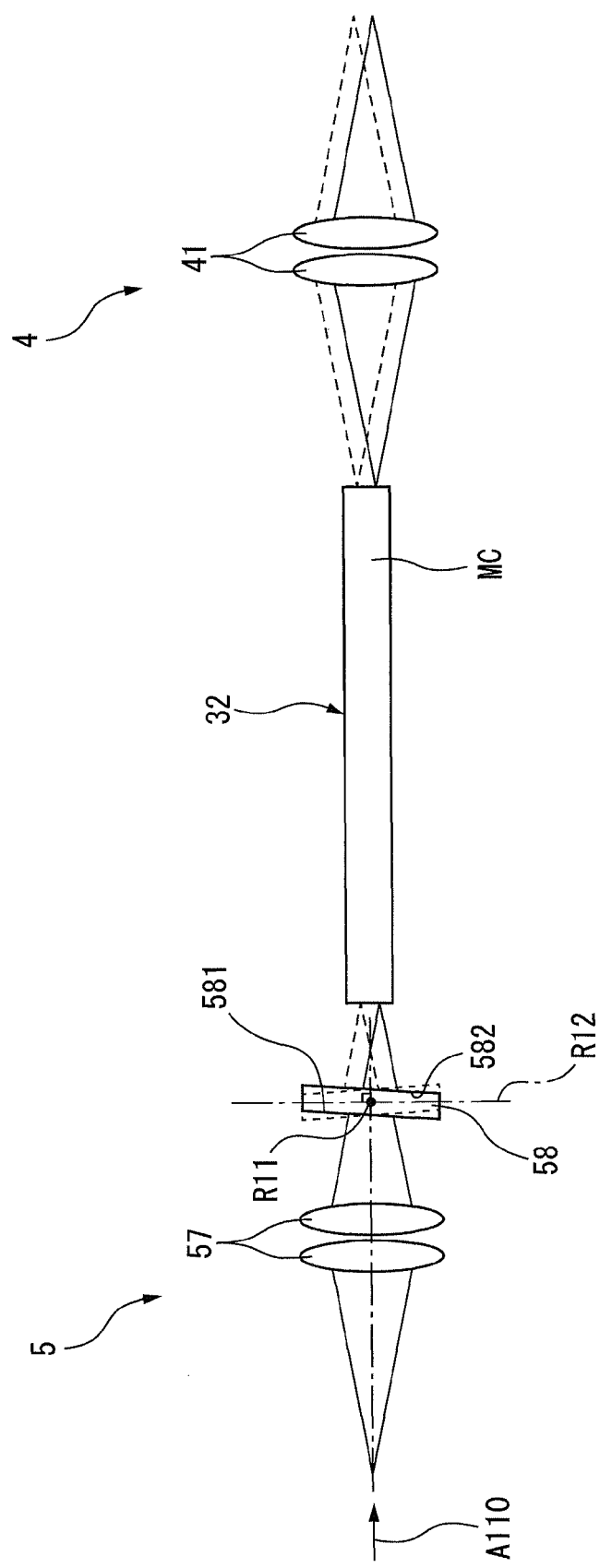
FIG. 11 is a schematic view, similar to FIG. 10, which shows a modification of the switching part in the laser processing apparatus of the present embodiment.

FIG. 11 is a schematic view, similar to FIG. 10, which shows a modification of the switching part 5 of the laser processing apparatus of the present embodiment. As shown in FIG. 11, the switching part 5 of the present embodiment comprises a single condensing optical system 57 which condenses laser light emitted from the first transmission part 31, and a light-transmitting optical board 58 which is located between the condensing optical system 57 and the second transmission part 32. The path of the laser light emitted from the first transmission part 31 and enters the condensing optical system 57 is shown by the arrow mark A110 in the figure. As shown in FIG. 11, the path of the laser light which enters the condensing optical system 57 is aligned with the optical axis of the condensing optical system 57. In the same way as the embodiment of FIG. 10, the laser light which passes through the condensing optical system 57 enters the first main surface 581 of the optical board 58, and then emits from the second main surface 582 of the optical board 58. The first and second main surfaces 581, 582 of the optical board 58 are preferably parallel to each other. The optical board 58 of the present embodiment is configured to rotate about the two rotation axes R11, R12 which are vertical to the optical axis of the condensing optical system 57 while the optical board 56 of FIG. 10 rotates about the rotation axis R10 along the optical axis of the condensing optical system 55. For this reason, along with the rotation of the optical board 58 about the rotation axes R11, R12, the main surface 581 of the optical board 58 is slanted with respect to the virtual plane which is vertical to the optical axis of the condensing optical system 57. As a result, in the same way as the embodiment of FIG. 10, the path of the laser light emitted from the optical board 58 is translated with respect to the path of laser light which enters the optical board 58 by a predetermined distance (see above formula 1).

For example, when the thickness of the optical board 58 is 10 mm and the refractive index of the optical board 58 is 1.5, rotation of the optical board 58 by 1° about either of the rotation axes R11, R12 causes translation of the path of the laser light by 58 μm. A general fiber core FC has a diameter of 50 μm to 400 μm or so, and therefore the optical board 58 with the above thickness and refractive index enables adjustment with excellent precision. Note that when the plurality of fiber cores FC are arranged two-dimensionally at the incident end of the second transmission part 32 (see FIG. 8), the optical board 58 needs to have two rotation axes R11, R12. However, when the plurality of fiber cores FC are arranged one-dimensionally at the incident end of the second transmission part 32 (see FIG. 2), the optical board 58 may have just one of either of the rotation axes. The optical board 58 of the present embodiment may be rotated by the user by hand, or rotated by a motor or other drive device.

In the above way, the laser processing apparatus 1 of the present embodiment, in the same way as the laser processing apparatus of the above first embodiment, enables adjustment of the condensing diameter and condensing angle etc. of the output laser light without changing the optical fiber which is connected to the processing head 4, and thus prevents entry of dust from the incident part of laser light around the processing head 4 (that is, the fitting part 401 of the body part 40) to the inside of the processing head 4 and consequent contamination of the optical components. Furthermore, according to the laser processing apparatus 1 of the present embodiment, the emission ends EE of the plurality of fiber cores FC of the second transmission part 32 are located closer to one another by for example a distance of 500 μm, and therefore it is possible to shorten the amount of movement of the condensing point of the processing head 4 due to switching of the fiber cores FC. Furthermore, the emission ends EE of the fiber cores FC are located closer to the center axis CA of the processing head 4, and therefore it is possible to suppress the influence of geometric aberration no matter which fiber core FC is selected. Accordingly, the laser processing apparatus of the present embodiment 1 can have a processing performance which compares favorably with a laser processing apparatus with only one single-core optical fiber being connected to the processing head.

Effect of Invention

According to the first aspect of the present invention, the switching part switches the single fiber core which transmits laser light to the processing head, and therefore it is possible to adjust the condensing diameter and condensing angle of the output laser light etc. without replacing the optical fiber which is connected to the processing head. Further, according to the first aspect, the emission ends of the plurality of fiber cores are fixedly arranged with respect to a single processing head, and therefore it is no longer necessary to provide a rotary member or other movable member in the vicinity of the incident part of laser light of the processing head. Therefore, according to the first aspect, it is possible to reliably prevent dust around the processing head from entering from the incident part to the inside of the processing head and contaminating the optical components, and thus possible to improve the dustproof property of the processing head.

According to the second aspect of the present invention, the emission ends of the plurality of fiber cores are fused to a single optical member, and therefore it is possible to facilitate cooling of a part generating heat due to refraction of laser light which passes through the fiber cores, and also facilitate application of a nonreflective coating to the emission ends of laser light which passes through the fiber cores.

According to the third aspect of the present invention, it is possible to arrange emission ends of adjoining fiber cores closer to each other by for example a distance of 1 mm or, and thus possible to reduce the amount of movement of the condensing point of the processing head due to switching of the fiber cores.

According to the fourth aspect of the present invention, it is possible to arrange emission ends of adjoining fiber cores closer to each other by for example a distance of 500 μm or so, and thus possible to reduce the amount of movement of the condensing point of the processing head due to switching of the fiber cores.

According to the fifth aspect of the present invention, it is possible to realize switching of the fiber cores by means of the simple method which comprises rotating an optical board about a rotation axis along the path of the laser light.

According to the sixth aspect of the present invention, it is possible to realize switching of the fiber cores by means of the simple method comprising rotating an optical board about a rotation axis vertical to the path of the laser light. In particular, when the emission ends of the plurality of fiber cores are arranged two-dimensionally, two rotation axes are required for switching the fiber cores, but when the emission ends of the plurality of fiber cores are arranged one-dimensionally, only a single rotation axis is required for switching the fiber cores.

According to the seventh aspect of the present invention, it is possible to adjust the properties of the laser light emitted from the processing head in accordance with the diameter, cross-sectional shape, refractive index, etc. of the fiber core, and thus possible to obtain the optimum laser light corresponding to the type of laser processing and the material, thickness, etc. of the workpiece. In particular, it is possible to adjust the condensing diameter and condensing angle etc. of the laser light by changing the diameter of the fiber core, and also possible to adjust the intensity of the laser light by changing the refractive index of the fiber core.

The present invention is not limited to the above-mentioned embodiment and can be modified in various ways within the scope described in the claims. For example, the laser processing apparatus 1 of the above embodiment is provided with a single laser light source 2, but the laser processing apparatus 1 of the present invention may also be provided with the same number of laser light sources 2 as the plurality of fiber cores FC which are included in the second transmission part 32. In this case, for example, the switching part 5 of the laser processing apparatus 1 operates to switch the on/off states of the power supplies of the individual laser light sources 2. Further, the dimensions, shapes, materials, etc. of the parts which were described in the above embodiments are only examples. Various dimensions, shapes, materials, etc. can be employed for achieving the effects of the present invention.

The invention claimed is:

1. A laser processing apparatus comprising:
   a laser light source which generates laser light;
   a light transmission part including a plurality of fiber cores which transmits the laser light generated by said laser light source;
   a processing head which condenses the laser light transmitted by said light transmission part to irradiate a workpiece, wherein each of said plurality of fiber cores has an emission end which faces said processing head and is fixedly arranged with respect to said processing head so as to emit the laser light to the processing head;
   a switching part which switches between the fiber cores to transmit the laser light to said processing head through the emission end; and
   a controller configured to:
   select one of the plurality of fiber cores through which to transmit the laser light to said processing head, and
      control the switching part to switch to the selected one of the plurality of fiber cores and transmit the laser light through the selected one of the plurality of fiber cores to the processing head.

2. The laser processing apparatus according to claim 1, wherein
   said emission ends of said plurality of fiber cores are fused to a single optical member which has the same refractive index as said plurality of fiber cores, and
   said optical member includes a nonreflective coating which is applied to an emission face of said optical member for emitting laser light which has passed through said optical member.

3. The laser processing apparatus according to claim 1, wherein
   said plurality of fiber cores are contained in a plurality of optical fibers respectively and
   said emission ends of said plurality of optical fibers are joined together.

4. The laser processing apparatus according to claim 1, wherein
   said plurality of fiber cores are contained in a single optical fiber.

5. The laser processing apparatus according to claim 1, wherein
   said switching part has an optical board which is located on a path of laser light generated by said laser light source and is inclined with respect to a plane which is vertical to said path, and said switching part is configured to rotate said optical board about an axis along said path so as to switch the fiber core which transmits laser light to said processing head.

6. The laser processing apparatus according to claim 1, wherein
   said switching part has an optical board which is arranged on a path of laser light generated by said laser light source, and said switching part is configured to rotate said optical board about an axis which is vertical to said path so as to switch the fiber core which transmits laser light to said processing head.

7. The laser processing apparatus according to claim 1, wherein
said plurality of fiber cores include two or more fiber cores which differ in at least one of diameter, cross-sectional shape, and refractive index.

* * * * *